(No Model.)

W. CHEGWIN.
ROAD CART.

No. 262,570. Patented Aug. 15, 1882.

Witnesses.

Inventor.

UNITED STATES PATENT OFFICE.

WILLIAM CHEGWIN, OF FOND DU LAC, WISCONSIN.

ROAD-CART.

SPECIFICATION forming part of Letters Patent No. 262,570, dated August 15, 1882.

Application filed May 25, 1882. (No model.)

*To all whom it may concern:*

Be it known that I, WILLIAM CHEGWIN, of Fond du Lac, Wisconsin, have invented a new and useful Improvement in Road-Carts, of which the following is a specification.

My invention relates to improvements in road carts or carriages having their entrances from the rear; and the object of my improvement is to provide a cheap and easy method of enlarging the space between the wheel and body of the vehicle for the more convenient and cleanly entrance and exit of passengers. I attain this object by the mechanism illustrated in the accompanying drawings, in which—

Figure 1:
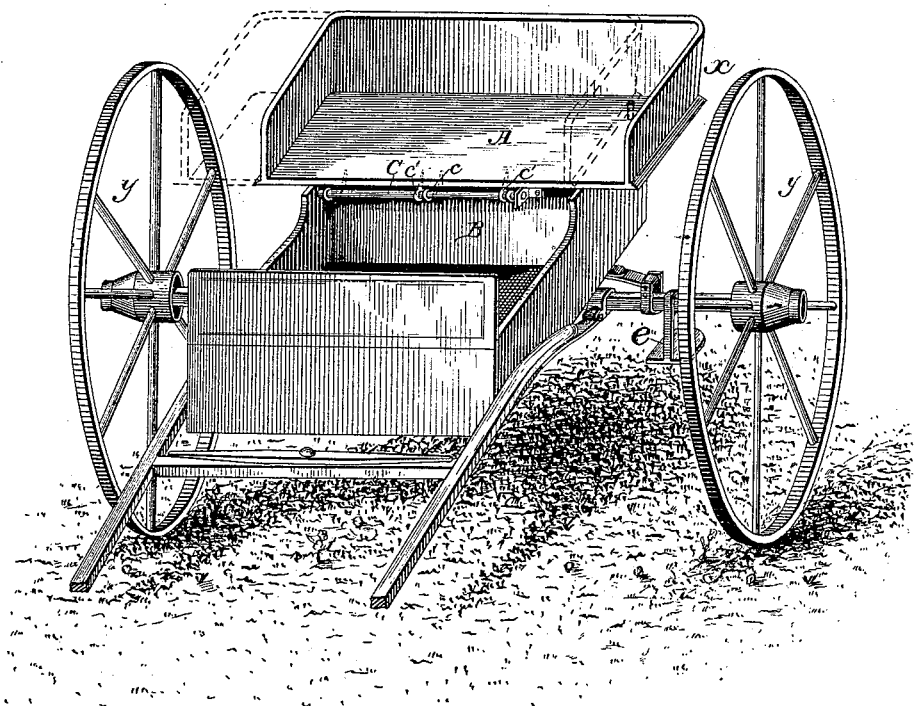
Figure 2:
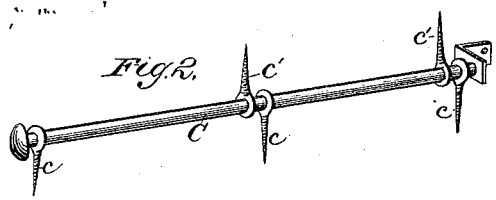

Figure 1 is a perspective view of the vehicle with my invention in place. Fig. 2 is a detailed view of my slide device.

Similar letters refer to similar parts throughout both views.

A narrow body, B, hung between two wheels, $y$, and supporting a seat, A, wider than the body and sufficient to accommodate two passengers, with a step or stirrup, $e$, upon the rear side of the axle, constitute substantially the road cart or carriage in common use. A prime objection to the vehicle is the narrow entrance-way $x$ between the arm-seat and wheel. To obviate this objection I first detach and then adjust the seat A to the body B with a lateral shift or slide by means of the horizontal rod C, extending, say, two-thirds of the width of the body from the side opposite the entrance-way, and affixed near the top and in the front of the body with screw-eyes or staples $c\ c\ c$. The ends of the rod are furnished with heads or nuts to hold it in place. The screw-eyes $c'\ c'$ are affixed to the bottom of the seat near the front edge, (on the sides of the rod, eyes, or staples $c\ c\ c$ in the direction of the movement,) and turn and slide on the rod C until checked by the staples $c\ c$.

It is obvious that before mounting the vehicle a slight raising of the seat by the back rail thereof and moving it laterally the space between the staples $c\ c$, as shown in Fig. 2, will enlarge the entrance-way or distance from seat-arm to wheel from two-thirds to double thereof, and when in the vehicle a similar movement in reverse will restore the seat to its place, as shown in Fig. 1. The pin $d$, set into the rear top of the body and entering its socket in the rear bottom of the seat, will hold the seat firmly in place.

I claim as my invention and desire to secure by Letters Patent—

1. The combination, in a road-cart or rear-entrance vehicle, of an adjustable lateral-moving seat, A $c'\ c'$, with the body B, having a slide-rod, C, affixed by eyes or staples $c\ c\ c$, working in connection with seat-eyes $c'\ c'$, the wheel $y$, and stirrup $e$, all substantially as and for the purposes set forth in the specification.

2. The combination, in a lateral movable carriage-seat, of the screw-eyes $c'\ c'$, slide-rod C, screw-eyes or staples $c\ c\ c$, and pin $d$ with the seat A and body B, substantially as and for the purposes described.

WILLIAM CHEGWIN.

Witnesses:
 I. B. PERRY,
 GEO. L. ARNOLD.